H. I. ANDREWS.
METHOD OF DESICCATING MILK.
APPLICATION FILED MAR. 31, 1910.
1,012,578.
Patented Dec. 26, 1911.
4 SHEETS—SHEET 3.
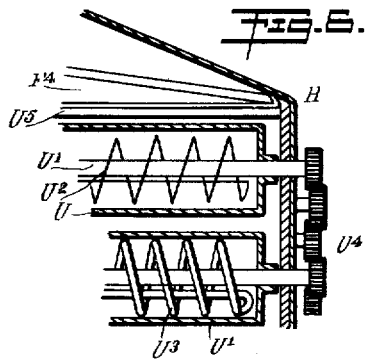
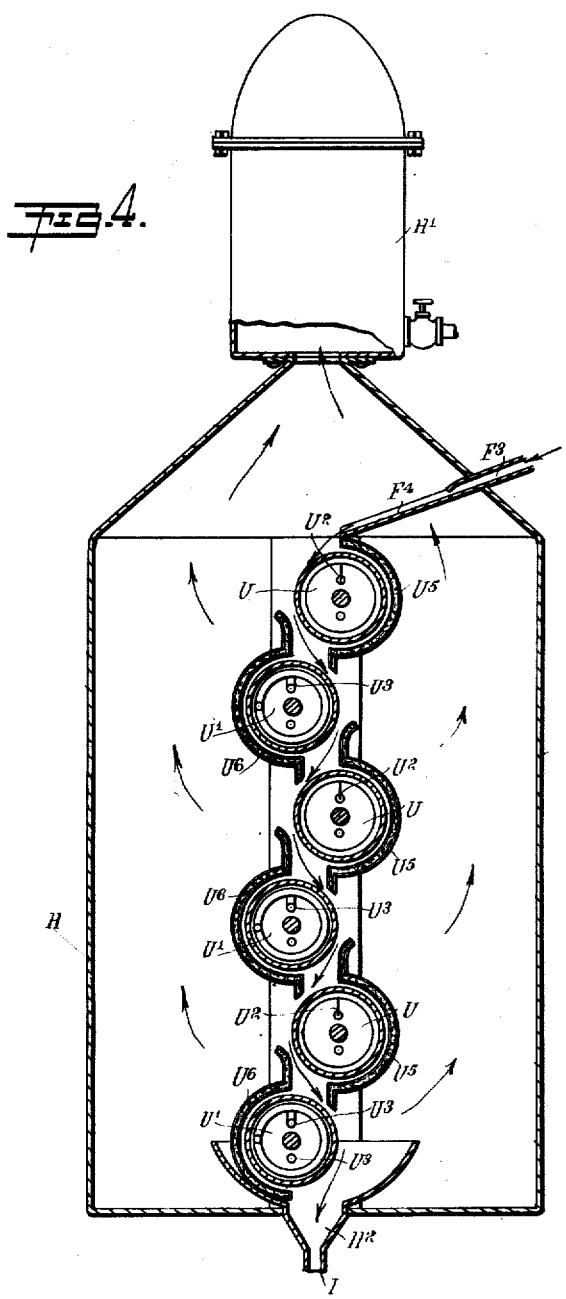
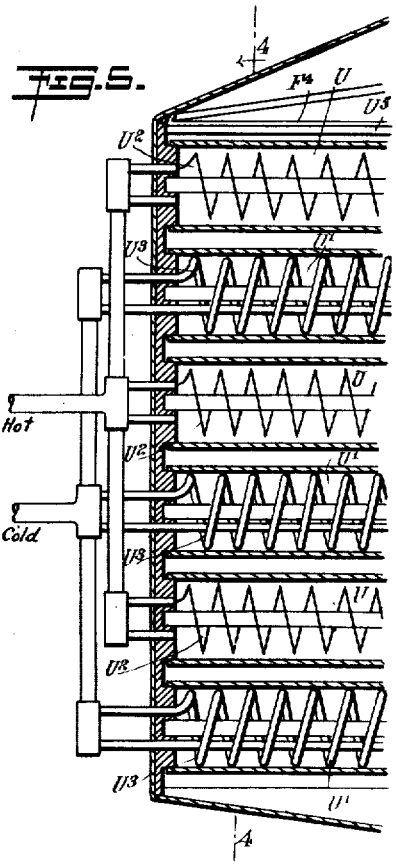
WITNESSES:
G. Robert Thomas
INVENTOR
Harry Irving Andrews
BY Munn & Co.
ATTORNEYS H. I. ANDREWS.
METHOD OF DESICCATING MILK.
APPLICATION FILED MAR. 31, 1910.
1,012,578.
Patented Dec. 26, 1911.
4 SHEETS—SHEET 4.
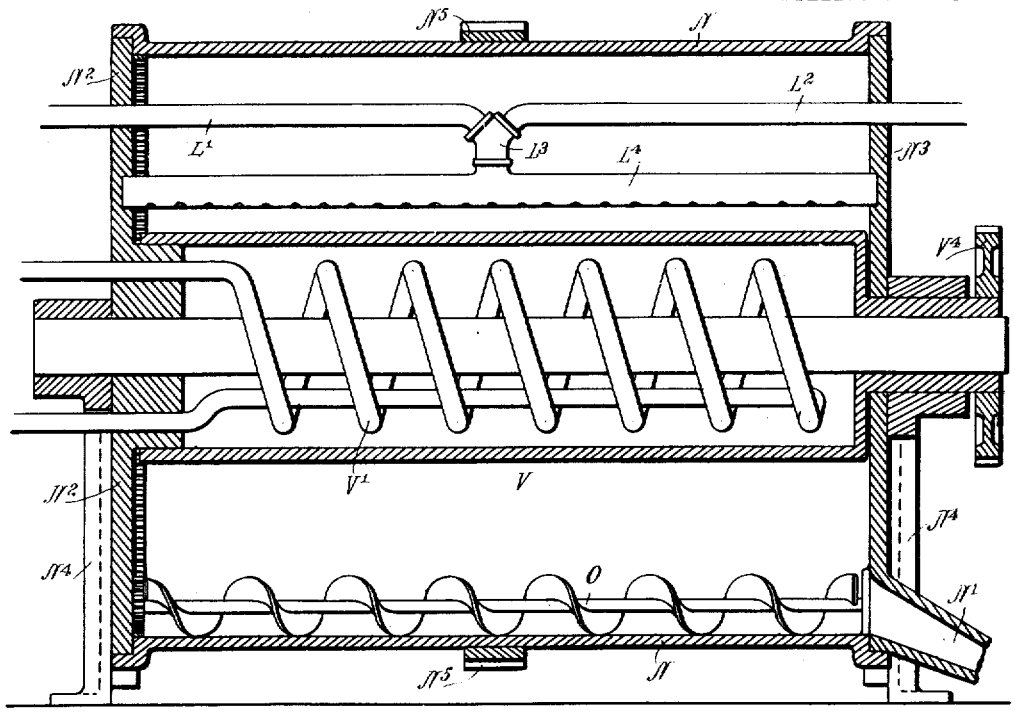
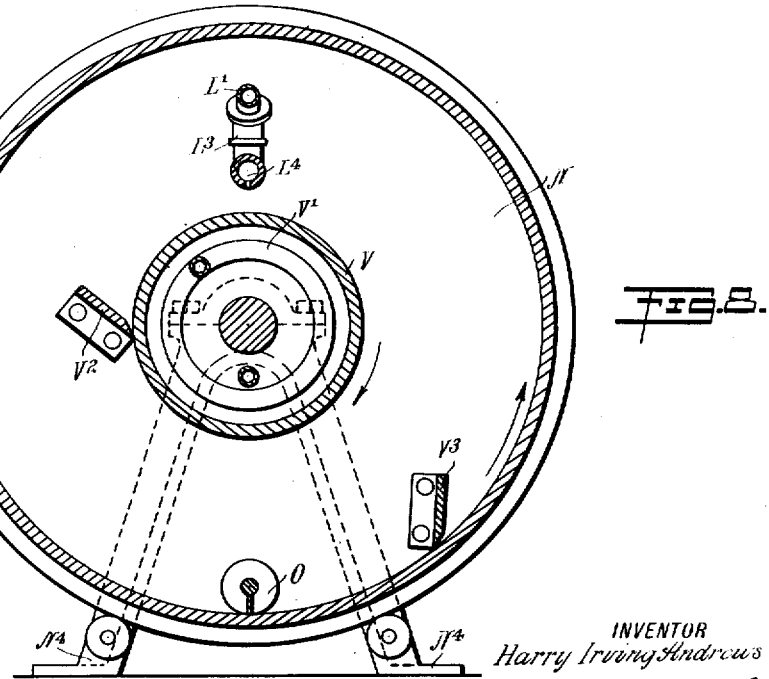
WITNESSES:
INVENTOR
Harry Irving Andrews
BY
ATTORNEYS

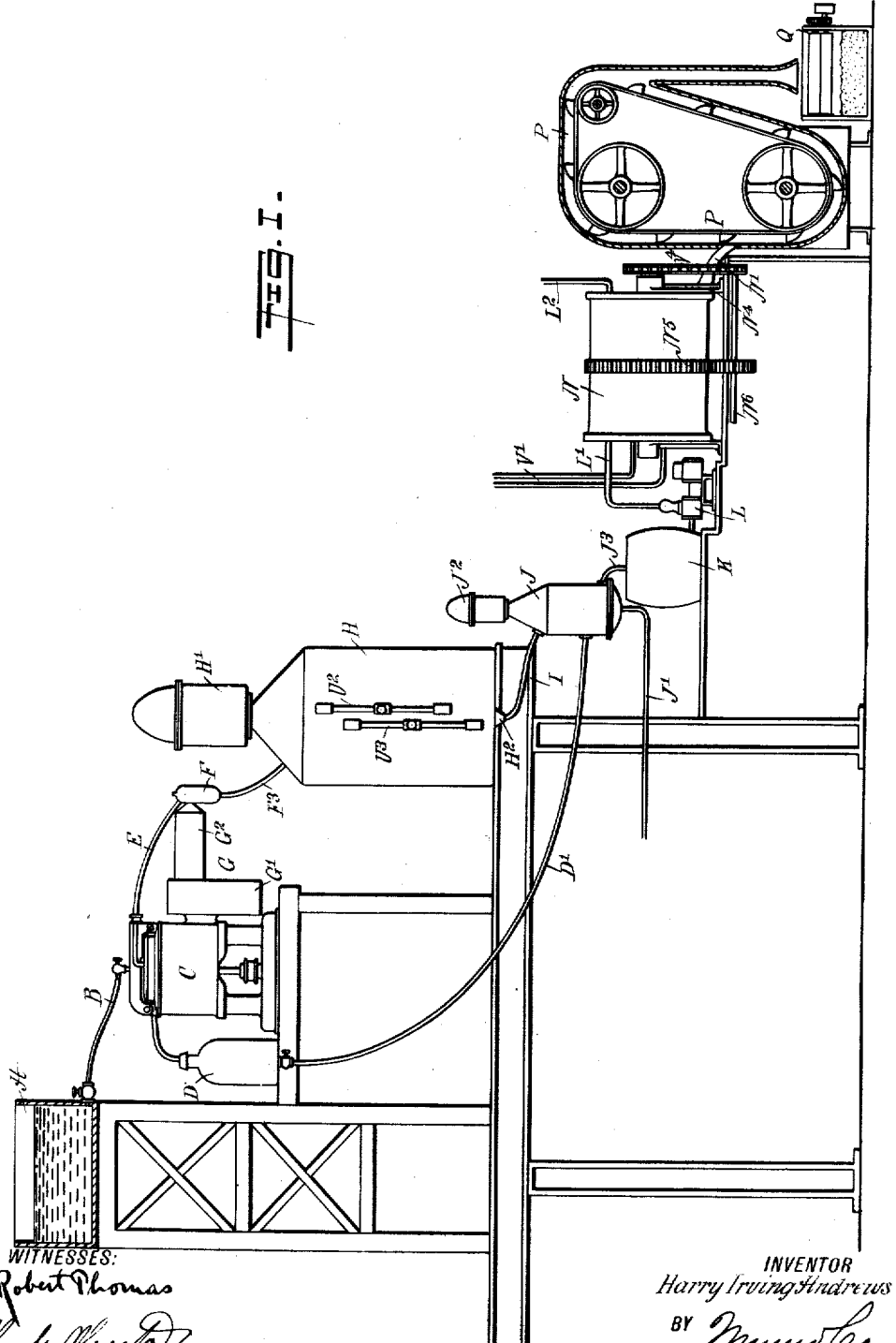

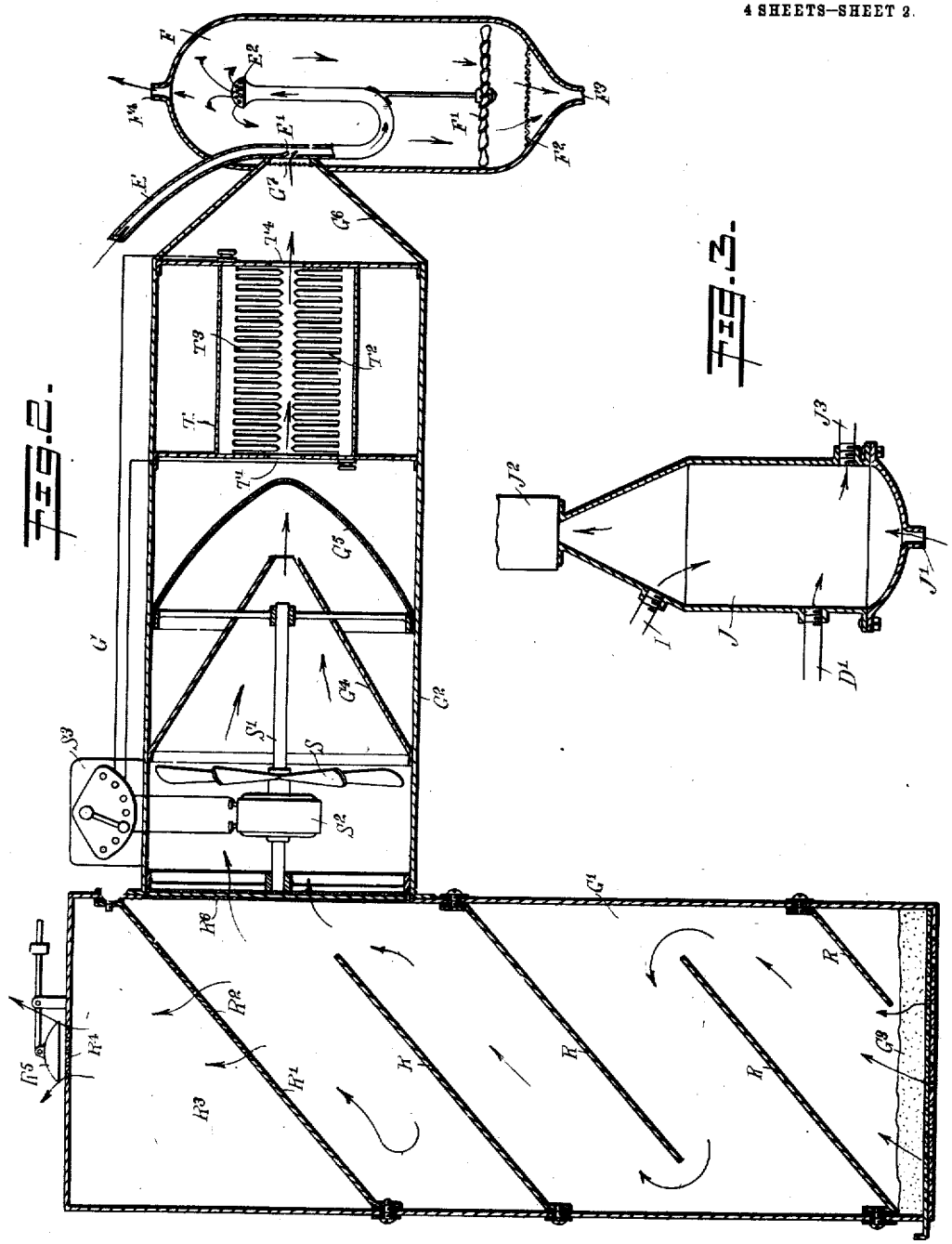

UNITED STATES PATENT OFFICE.

HARRY IRVING ANDREWS, OF DARIEN, CONNECTICUT, ASSIGNOR OF FORTY ONE-HUNDREDTHS TO CHARLES A. DAVIS, OF DARIEN, CONNECTICUT.

METHOD OF DESICCATING MILK.

1,012,578.     Specification of Letters Patent.     Patented Dec. 26, 1911.

Application filed March 31, 1910. Serial No. 552,560.

*To all whom it may concern:*

Be it known that I, HARRY IRVING ANDREWS, a citizen of the United States, and a resident of Darien, in the county of Fairfield and State of Connecticut, have invented a new and Improved Method of Desiccating Milk, of which the following is a full, clear, and exact description.

The object of the invention is to provide a new and improved method for desiccating milk, whereby whole milk or skimmed milk is reduced to either the consistency of ordinary condensed milk, or to flour or a powder, at the same time ozonizing the milk to render the milk free from germs and bacteria, to permit of keeping it for a long time without danger of spoiling, and to allow reconstruction to normal whole or skimmed milk with the addition of water, and without change in the homogeneity, flavor, digestibility and nutritive value of the original milk.

The method consists essentially in subjecting the milk to a continuous gravity flow, mixing the milk during the flow with ozone and subsequently evaporating the moisture in the milk by subjecting the milk during the gravity flow alternately to heat and cold.

In order to carry the method into effect, use is made of an apparatus, such as shown in the accompanying drawings, in which similar characters of reference indicate corresponding parts in all the views.

Figure 1 is a side elevation of the apparatus, arranged for treating whole milk, parts being shown in section; Fig. 2 is an enlarged sectional side elevation of the ozonizer, and the sterilizer in which the milk is mixed with the ozone produced by the ozonizer and the sterilizer in which the milk is mixed with ozone produced by the ozonizer; Fig. 3 is an enlarged sectional side elevation of the aerator for mixing the ozonized milk in concentrated form with the previously extracted cream and with air or oxygen for revitalizing the milk; Fig. 4 is an enlarged rear sectional side elevation of the evaporator, the section being on the line 4—4 of Fig. 5; Fig. 5 is a cross section of the front portion of the same; Fig. 6 is a like view of the rear portion of the same; Fig. 7 is an enlarged sectional side elevation of the drum for changing the sheet milk into strips and chips; and Fig. 8 is a cross section of the same.

The whole milk to be treated is contained in an overhead tank A, connected by a valved connection B with a cream separator C, of any approved construction, in which the cream and the milk are separated, the cream being discharged into a vessel D, and the skimmed milk being discharged by a pipe E into a sterilizer or degermer F, in which the milk is sterilized by the use of ozone intimately mixed with the milk. The ozone used is produced by an ozonizer G, hereinafter more fully described in detail. The sterilized or ozonized milk flows from the bottom of the sterilizer F into an evaporator H, in which the milk sterilized is deprived of its moisture at an approximately normal temperature, say, from 60° to 72° F. The ozonized milk is transformed in the evaporator to a condensed consistency and flows out at the bottom of the evaporator into a pipe I, which conducts the condensed milk into an aerator J connected by a pipe D' with the vessel D, so that the previously separated cream can pass from the vessel D into the aerator J, to be reintroduced into the condensed milk together with the dry air or oxygen introduced into the bottom of the aerator, by a pipe J', connected with a suitable source of air supply. By the mixing of the cream with the milk, whole milk is reconstructed but in condensed form, and this milk is revitalized by the introduction of air or oxygen, the surplus air being drawn off by a small vacuum pump $J^2$ on top of the aerator J.

The milk flows from the aerator J by way of a pipe $J^3$ into a closed receptacle or a tank K, from which the milk is transferred, by a pump L or other device, into a drum N, in which the milk is changed into strips and chips, carried by a conveyer O to a chute N', which leads to a bucket or other elevator P carrying the strips and chips to a grinder Q, employed for reducing the strips and chips to powdered form. From the time the milk leaves the separator C until it is changed into sterilized strips and chips, it is not contaminated by contact with atmospheric air, and the milk is not subjected to extreme heat or cold, and hence its valuable properties are not destroyed, so that the produced solid milk can be readily reconstructed, by the addition of water, to normal milk and without changing the homogeneity, flavor, digestibility and nutritive value of the original milk.

The detailed construction of the sterilizer F and the ozonizer G is as follows, special reference being had to Fig. 2: The ozonizer G is provided with a vertically-disposed electric, air-drying casing G' and an ozonizing casing $G^2$ extending horizontally from the upper portion of the casing G'. On the perforate bottom of the air-drying casing G' is arranged a filter or screen $G^3$, in the form of a loose filtering material, as indicated in Fig. 2, for filtering the air passing through the perforated bottom into the casing G', and within the latter, above the filter $G^3$, are arranged baffle plates R, preferably heated by electricity and extending alternately from opposite sides of the casing G', to cause the air to travel upwardly in a zigzag manner, with a view to becoming thoroughly and uniformly heated by contact with the heated plates R. A top plate R' extends from the side of the casing G' and is provided with perforations $R^2$ leading to a chamber $R^3$ in the upper end of the casing G'. The top of the chamber $R^3$ is provided with outlet openings $R^4$, over which extends a counterbalanced valve $R^5$ to govern the escape of the aqueous vapors liberated into the chamber G'. A screen or a filter $R^6$ is set in the junction between the casings G' and $G^2$ at the space immediately below the plate R', and within the casing $G^2$ is arranged a fan S for drawing the electrically heated air from the casing G' into the casing $G^2$, the said fan S having a shaft S' driven by an electric motor $S^2$, the speed of which is controlled by a resistance coil $S^3$ in the motor circuit. It is understood that when the fan S is running atmospheric air is drawn into the air drying casing G' by way of its perforated bottom and the filter $G^3$, so that the air is first filtered and then heated by the electrically heated plates R, to dry the air, that is, to separate the aqueous vapors from the air, and as the said aqueous vapors are lighter than air they rise quickly and pass by way of the perforations $R^2$ into the chamber $R^3$ and out of the same by way of the outlet opening $R^4$ into the atmosphere. The air freed of the extraneous matter is drawn through the screen $R^6$ into the ozonizing casing $G^2$, and by the use of the said screen the air is thoroughly purified. The purified air is forced by the fan S forward and through a funnel $G^4$, conical screen or filter $G^5$ and an opening T' into a glass chamber T and over a pair of nickel combs $T^2$, $T^3$ held in the said chamber. The combs $T^2$, $T^3$ are charged with electricity so that the oxygen in passing over the combs is changed into its allotropic form of ozone, which latter passes out of the chamber T by an outlet opening $T^4$ into a cooling chamber $G^6$ having a screened contracted outlet $G^7$ connected with a slit E' formed in the pipe E within the sterilizer F. The chamber $G^6$ is cooled by any suitable air cooling means.

The nozzle $E^2$ is arranged centrally in the upper portion of the sterilizer F, and the discharged milk, with the ozone held in suspension therein, drops down in the sterilizer F and in contact with a fan wheel or agitator, which is thus rotated and causes a thorough ozonizing of the milk. A screen $F^2$ is arranged below the fan wheel F', and from the funnel-shaped bottom of the sterilizer leads a pipe $F^3$ to the evaporator H. The top of the sterilizer is provided with an escape opening or vent, for the escape of the moisture and carbonic acid gas.

When the apparatus is in use, the milk, mixed with the ozone held therein, is sprayed in the sterilizer F, the ozone being produced in the ozonizer G by passing the dry-heated air from the chamber G' over the high voltage combs $T^2$, $T^3$.

It is understood that the ozone tends to destroy the living germs in the milk and the gases incident to the action of the ozone on the milk escape through the outlet $F^4$ of the sterilizer, and hence are removed from the milk without affecting the enzyms or life of the milk. It is further understood that the milk is not heated or boiled in the sterilizer in order to destroy the living germs in the milk.

The evaporator is arranged as follows: Within the evaporator H is arranged a series of alternating metallic rollers U and U', of which the rollers U are heated, preferably by means of electric heating coils $U^2$, and the rollers U' are cooled by refrigerating coils $U^3$, the said coils $U^2$, $U^3$ being connected with suitable sources of heat and cold supplies. The rollers U and U' are located one below the other in such a manner that the milk passes from one roller to the other, it being understood that the milk is discharged in a spread condition onto the peripheral surface of the uppermost hot roller U by a chute $F^4$, arranged within the evaporator H and connected with the pipe $F^3$ leading from the sterilizer F. The rollers U and U', at their rear surfaces, are protected by semicircular shields $U^5$, $U^6$, arranged in such a manner that they do not interfere with the flow of the milk from one roller to the other, and at the same time the shields $U^5$, $U^6$ prevent to a great extent undue radiation of the heat and cold from the rollers U, U'. Each of the shields $U^5$, $U^6$, is preferably made in the form of a sheet metal casing, filled with asbestos or other non-heat conducting material. The rollers U and U' are driven by a train of gear wheels $U^4$ (see Fig. 6), set in motion from a suitable motor or other driving mechanism. The milk, in passing over the alternating hot and cold rollers U and U' in a laterally spread condition, is converted into condensed form, and the moisture separating from the milk by contact with the heated rollers is drawn out of the evaporator H by a suitable suction pump H', connected with the top of the evaporator H. The milk is delivered in sheet form by the last roller U' into a pan H², having a contracted mouth so that the sheet form of the milk is molded to the shape of the said contracted mouth and flows from the latter into and through a downwardly-extending pipe I leading from the said contracted mouth. It is understood that the condensed milk is sufficiently liquid to flow by gravity through the pipe I which latter delivers the milk to the aerator J, in which the milk is mixed with the cream from the vessel D, and also with air passing through the pipe J' into the aerator, which latter is provided on top with the small suction pump J² for causing the air to circulate through the aerator. Thus the milk is revitalized in the aerator, and at the same time the cream is reincorporated in the milk, which passes from the aerator J by the pipe J³ into the tank K.

The drum N, for changing the condensed milk into strips or chips, is mounted to turn on heads N², N³, fixed to standards N⁴ (see Figs. 7 and 8), and the drum N is externally driven by suitable gearing N⁵. Through the upper portion of the fixed head N² extends the discharge pipe L' of the pump L, and the pipe L' connects within the drum N with a pipe L², by the use of a fitting L³, connecting with a pipe L⁴, attached to the heads N², N³, and provided in its bottom with perforations, as plainly shown in Figs. 7 and 8. The pipe L² is connected with a supply of hot compressed air, so that the condensed milk and the hot air pass into the pipe L⁴ and through the perforations thereof, down onto the peripheral surface of a roller V, arranged centrally within the drum N. The roller V is provided with an internal refrigerating coil V', for keeping the roller cool, and the peripheral surface is engaged by the cutting edge of a knife V², secured to the heads N², N³, so as to scrape the milk off the peripheral surface of the drum N and in doing so form the milk into strips and chips, which drop upon the bottom of the drum N, to be carried by the conveyer O, to the chute N', extending from the head N³, as plainly indicated in Fig. 7. A scraper V³ attached to the heads N², N³ engages the inner surface of the drum N, to scrape off any material that may adhere to the inner surface of the drum N. The roller V is preferably driven by a suitable connection V⁴, such as sprocket wheels and sprocket chains, from the driving shaft N⁶ of the gearing N⁵, to cause the drum N and the roller V to rotate in unison, and in the direction indicated by the arrow in Fig. 8.

It is understood that the milk passing out of the perforations of the pipe L⁴ onto the roller V is in fine streams, and quickly congeals and hardens by contact with the cold roller V, and the congealed and hardened layers or strips are readily broken or cut up by contact with the knife V² into small pieces or chips, carried out of the drum by the conveyer O and chute N', to be carried by the elevator P to the grinder Q, which may be of any approved construction, for grinding the flakes into powder.

The operation is as follows: When the apparatus is in use, the milk flows continuously in a regulated quantity from the tank A into the cream separator C, in which the cream is separated from the milk, and passes into the vessel D, while the milk passes to the sterilizer in which it is ozonized. From the sterilizer the ozonized milk passes into the evaporator H in a continuous stream and is condensed therein by evaporation, during its passage over the rollers U and U', the milk in condensed form now passing to the aerator, in which the cream from the vessel D is reunited with the milk and revitalized by the air. As the milk is in condensed form, it holds the cream firmly and prevents its rising in the milk, and the cream is uniformly disseminated throughout the milk to keep in good condition. The milk is next treated in the drum N to hot air and contact with a cold drum, to cause the milk to congeal and harden in strips or layers, cut or broken up to form chips, which latter are then removed from the drum and carried to the grinder, to be ground into powder ready for the market.

From the foregoing it will be seen that the operation is continuous, to permit the production of a large quantity of desiccated milk in a correspondingly short time.

In case it is desired to desiccate skimmed milk only, the cream extractor C is dispensed with and the milk is ozonized in the sterilizer F, then evaporated in the evaporator H, to assume condensed form, after which the condensed milk is aerated, if deemed necessary, or directly passed into the drum N, to be formed into chips, subsequently ground into powder form by the grinder Q.

It is understood that in case it is desired to use the milk in condensed form, it is filled directly into suitable receptacles from the evaporator H or the aerator J.

The temperature of the rollers U ranges from 70° to 105° F., while that of the cold rollers U' may reach zero or even go below the zero point, so that the milk in its alternate contact with the hot and cold rollers U, U', is not liable to reach more than 98° F. but usually attains a normal temperature of say from 60 to 72° F.

It is understood that the compressed air in the pipe L² forces the milk condensed onto the roller V, the temperature of which is kept at about zero, so that the milk congeals and assumes a hardened or solid form, readily cut into strips by the knife or cutter V².

It will also be noticed that the hot compressed air delivered by the pipe L² into the milk causes further evaporation of aqueous matter that may still be contained in the milk. By this additional evaporation the milk is condensed still further and becomes of a thicker consistency, and is hence more rapidly congealed on contact with the roller V.

From the foregoing it will be seen that the skimmed milk passes successively through the sterilizer F, the evaporator H and the aerator J, to finally reach the tank K under a continuous gravity flow, and during this continuous gravity flow the milk is mixed with ozone and purified in the sterilizer F, then evaporated in the evaporator H by coming alternately in contact with the hot and cold rollers U, U', and then the evaporated milk is aerated in the aerator J, and finally passes into the tank K. The milk in this condensed form may be withdrawn from the tank and marketed, if so desired, or by the subsequent treatment of the milk in the drum N the milk is formed into strips, but this operation is not carried on under a gravity flow but use is made of the pump L to avoid too great a height in the building in which the several apparatus are located.

Having thus described my invention, I claim as new and desire to secure by Letters Patent:

1. The herein described process for desiccating milk, comprising the following steps, namely mixing the milk while under a gravity flow with ozone, then subjecting the milk while under gravity flow alternately to the action of heat and cold to evaporate the moisture in the milk, then congealing the milk and forming it into strips, then breaking the strips of milk into small pieces and finally reducing the same to powder.

2. The herein described process for condensing milk, comprising the following steps, namely separating the milk and cream, then mixing the milk while under gravity flow with ozone, then subjecting the milk while under gravity flow alternately to the action of heat and cold, then mixing the evaporated milk with the cream and air.

3. The herein described process for desiccating milk, consisting in separating the milk and cream, then mixing the milk while under gravity flow with ozone, then subjecting the milk while under gravity flow alternately to the action of heat and cold, then mixing the evaporated milk with the cream and air, then congealing the whole milk and forming it into strips, then breaking the strips of milk into small pieces, and finally reducing the same to powder.

4. The herein described process for condensing milk, comprising the following steps, namely mixing the milk with ozone, then spreading the milk into thin sheet form, then subjecting the milk while under gravity flow alternately to the action of heat and cold to deprive the milk of moisture.

5. The herein described process for desiccating milk, consisting in separating the cream and milk, then mixing the milk with ozone, then spreading the milk into thin sheet form and subjecting it alternately to heat and cold to deprive the milk of moisture, then mixing the evaporated milk with cream and air, then congealing the whole milk and forming it into strips, then breaking the strips of milk into small pieces and finally reducing the same to powder.

6. The herein described process for desiccating milk, comprising the following steps, namely mixing the milk with ozone, then spreading the milk into thin sheet form and subjecting it alternately to heat and cold to deprive the milk of moisture, then pressing the evaporated milk into a thin stream and congealing it into strips, then breaking the strips of milk into small pieces and finally reducing the same to powder form.

In testimony whereof I have signed my name to this specification in the presence of two subscribing witnesses.

HARRY IRVING ANDREWS.

Witnesses:
THEO. G. HOSTER,
PHILIP D. ROLLHAUS.